United States Patent
Tikhomirov et al.

(10) Patent No.: US 11,886,577 B2
(45) Date of Patent: Jan. 30, 2024

(54) SYSTEM AND METHOD FOR PROTECTING A USER'S DEVICES BASED ON TYPES OF ANOMALY

(71) Applicant: AO Kaspersky Lab, Moscow (RU)

(72) Inventors: Anton V. Tikhomirov, Moscow (RU); Evgenii Shchetinin, Moscow (RU)

(73) Assignee: AO Kaspersky Lab, Moscow (RU)

( * ) Notice: Subject to any disclaimer, the term of this patent is extended or adjusted under 35 U.S.C. 154(b) by 438 days.

(21) Appl. No.: 17/233,980

(22) Filed: Apr. 19, 2021

(65) Prior Publication Data
US 2022/0058262 A1    Feb. 24, 2022

(30) Foreign Application Priority Data
Aug. 24, 2020    (RU) .................. 2020128103

(51) Int. Cl.
*G06F 21/55*    (2013.01)
*G06N 20/00*    (2019.01)
*G06N 5/04*    (2023.01)

(52) U.S. Cl.
CPC .............. *G06F 21/554* (2013.01); *G06N 5/04* (2013.01); *G06N 20/00* (2019.01); *G06F 2221/034* (2013.01)

(58) Field of Classification Search
CPC . G06F 21/554; G06F 2221/034; G06N 20/00; G06N 5/04
See application file for complete search history.

(56) References Cited

U.S. PATENT DOCUMENTS

| 2016/0036844 A1* | 2/2016 | Kopp | G06N 5/045 726/1 |
| 2019/0387011 A1 | 12/2019 | Du et al. | |
| 2020/0382538 A1* | 12/2020 | Feezell | H04L 63/1433 |

FOREIGN PATENT DOCUMENTS

WO    WO-2017192628 A1 *    11/2017    ......... A63B 22/0046

* cited by examiner

*Primary Examiner* — Ayoub Alata
(74) *Attorney, Agent, or Firm* — ArentFox Schiff LLp; Michael Fainberg

(57) ABSTRACT

Disclosed herein are systems and methods for protecting a user's devices based on types of anomalies. In one aspect, an exemplary method comprises, determining, by a feature determiner, one or more values of features of a user's activity performed using at least one of the user's devices, detecting, by an anomaly detector, anomalies indicative of at least one threat to information security of the user's devices based on the one or more values of the features, for each detected anomaly, identifying, by the anomaly detector, a type of the anomaly and at least one device that is a source of the anomaly, wherein the type of anomaly is identified using an anomaly classifier and one or more values of features, and for each user's device, modifying, by a device protector, one or more information security settings of the user's device based on the identified type of the anomaly.

19 Claims, 4 Drawing Sheets

SYSTEM AND METHOD FOR PROTECTING A USER'S DEVICES BASED ON TYPES OF ANOMALY

CROSS REFERENCE TO RELATED APPLICATIONS

The present application claims priority to Russian Patent Application No. 2020128103, filed on Aug. 24, 2020, the entire content of which is incorporated herein by reference.

FIELD OF TECHNOLOGY

The present disclosure relates to the field of information security, and specifically, to systems and method for protecting devices of a user by modifying information security settings based on types of detected anomalies.

BACKGROUND

Computer devices, and more recently the "Internet of Things" (IoT), are becoming increasingly widespread features of users' daily life. Thus, the daily routine of a user or a group of users (a household) may include a number of devices such as smartphones, notebooks, routers, data storage system, smart watches, and the like. Many of a user's devices interact with each other; for example, they may be connected to a single network, or applications may be installed in devices for access to services and/or common data storage, and so on.

The Internet of Things has developed rapidly in recent years. This is due to technological developments, the introduction of new communications standards, particularly 5G, and the accessibility of the technology. By 2018, there were already 22 billion IoT devices worldwide. However, this development and growth has been accompanied by a rise in the number and complexity of threats to information security, particularly by harmful software. Furthermore, many software producers have been unable to rectify known vulnerabilities or to issue updates to remove them. Moreover, not all software producers conduct comprehensive testing or use advanced design standards. At the same time, the provision of data protection for a set of user's devices is becoming an even more complex task because of the continual exchange of data among the devices in each set. Consequently, a loss of information security in one device may affect the information security of other devices and services.

Existing means of protecting devices, such as antivirus systems, are reasonably capable of detecting known harmful software. However, antivirus systems are not always capable of detecting new, previously unknown threats. Furthermore, most antivirus solutions operate on one device only, and do not exchange data on threats with other devices of a user, making the task of increasing the degree of protection of the devices infeasible. Thus, a technical problem arises regarding the poor quality of information security in a set of a user's devices. An analysis of existing approaches indicates that the previous technologies are ineffective, and in some cases inapplicable, for the provision of information security for a set of a user's devices. In particular, when the user has a variety of interconnected devices, the data integrity across all of the devices is not adequately provided by technologies that rely on deploying antivirus solutions on single devices.

In view of the growth in the number and variety of computer devices operated by users, there is a need for a more optimal and effective way of protection devices of a user.

SUMMARY

Aspects of the disclosure relate to information security, more specifically, to systems and methods of protecting devices of a user by based on types of anomaly. In one aspect, the method of the present disclosure is based on data on threats and knowledge collected from the whole range of user's devices and services. The shortcomings of the previous approaches are remedied by gathering data on threats and knowledge of threats and remedies from all of the user's devices that are interconnected as well as from services accessed via each user device.

In one exemplary aspect, a method is provided protecting devices of a user by modifying information security settings based on types of anomaly, the method comprising: determining, by a feature determiner, one or more values of features of a user's activity performed using at least one of the user's devices, detecting, by an anomaly detector, anomalies indicative of at least one threat to information security of the user's devices based on the one or more values of the features, for each detected anomaly, identifying, by the anomaly detector, a type of the anomaly and at least one device that is a source of the anomaly, wherein the type of anomaly is identified using an anomaly classifier and one or more values of features, and for each user's device, modifying, by a device protector, one or more information security settings of the user's device based on the identified type of the anomaly.

In one aspect, the detection of the anomalies is performed using a trained anomaly detection model whose inputs are the determined one or more values of features.

In one aspect, the inputs to the anomaly classier comprise the determined one or more values of features.

In one aspect, a model trainer is used for training and/or supporting of the anomaly detection model according to data in a training sample, including at least the values of features over a historical period of observation.

In one aspect, the anomaly detection model and the anomaly classifier are tested on data of a test sample and are validated using a validation sample, the testing and validation are performed using the model trainer or a second model trainer, the test and validation samples further include the values of features over a historical period of observation, and wherein the threat to information security due to the anomaly and the devices in which the anomaly appeared are known for at least a specified portion of the values of the features.

In one aspect, the model trainer is further used for the training and further supporting of the anomaly classifier on data in a second training sample, wherein the data includes groups of values of features which are formed based on data received from the feature determiner, the data being for a second historical period of observation.

In one aspect, the anomaly detector receives a trained anomaly classifier from a remote server, wherein a second model trainer is located on the remote server and is used for the training and further supporting of the anomaly classifier on the data of a third training sample, the third training sample being formed by the second model trainer based on data from the feature determiner of the user's devices gathered over a second historical period of observation.

In one aspect, a machine learning model is used to identify an optimal modification of the one or more information security settings, wherein the identification of the optimal modification comprises, receiving, as an input, the type of anomaly, and selecting, from among a plurality of modifications of the information security settings, the modifications that provide the best protection for the devices.

In one aspect the user's activity comprises at least one of: a presence at a specific location, a user's movement changing a physical location of the user, a driving of a vehicle, a user's interaction with any number of the user's devices, an interaction with at least one new device, a user's interaction with any number of user's services, an interaction of a user device or a user service with any other user device or user service, and a data exchange between any number of the user devices.

In one aspect, the features include one or more of: an interaction of a device with a server, a connection of a new device to a network of the user's devices, a number of new devices connected to the network of the user's devices, an access to resources of one of the user's device, the resources including at least a memory or a processor, a list of resources of one of the user's device that are accessed, a feature of a particular user device, a transmission of data to or from a user device, a type of data to be transmitted, the type of data including at least one of a command, raw data or encrypted data, any number of antivirus events, and a type of activity of the user.

In one aspect, the features further include features of a scheduled activity, wherein values of the feature of the user's activity are obtained from a set of the user's services.

In one aspect, the method further comprises: modifying, by the device protector, information security settings of other user devices, wherein the other user devices that are modified comprise at least one of: devices relating to an identified device, devices having a same owner, and devices having similar features.

In one aspect, the threat to information security includes at least a disruption or an attempted disruption to information security of a device, wherein the disruption or attempted disruption is accomplished by at least one of: an unauthorized access to a user's data, a fraud, and a loading or running of harmful software.

In one aspect, the device protector modifies the information security settings in a specified device according to a specified type of anomaly based on the determined values of the features, wherein the modification includes at least one of: performing antivirus checking using up-to-date databases, modifying network parameters, limiting any number of functionalities of the device whose information security settings are being modified, limiting interactions of the device with other devices, limiting access to the resources of the device, switching on multi-factor authentication for the device, renewing a device protector on the device in which the anomaly has been identified, and receiving feedback on results of modifications of information security settings that are already performed for the device.

According to one aspect of the disclosure, a system is provided for protecting devices of a user by modifying information security settings based on types of anomaly, the system comprising a hardware processor configured to: determine, by a feature determiner, one or more values of features of a user's activity performed using at least one of the user's devices, detect, by an anomaly detector, anomalies indicative of at least one threat to information security of the user's devices based on the one or more values of the features, for each detected anomaly, identify, by the anomaly detector, a type of the anomaly and at least one device that is a source of the anomaly, wherein the type of anomaly is identified using an anomaly classifier and one or more values of features, and for each user's device, modify, by a device protector, one or more information security settings of the user's device based on the identified type of the anomaly.

In one exemplary aspect, a non-transitory computer-readable medium is provided storing a set of instructions thereon for protecting devices of a user by modifying information security settings based on types of anomaly, wherein the set of instructions comprises instructions for: determining, by a feature determiner, one or more values of features of a user's activity performed using at least one of the user's devices, detecting, by an anomaly detector, anomalies indicative of at least one threat to information security of the user's devices based on the one or more values of the features, for each detected anomaly, identifying, by the anomaly detector, a type of the anomaly and at least one device that is a source of the anomaly, wherein the type of anomaly is identified using an anomaly classifier and one or more values of features, and for each user's device, modifying, by a device protector, one or more information security settings of the user's device based on the identified type of the anomaly.

The method and system of the present disclosure are designed to provide information security, in a more optimal and effective manner and to identify types of anomaly for each device of the user and protect each device based on a type of anomaly.

The first technical result is an improvement in the level of protection of computers. The second technical result is a reduction of type I (false positive) and type II (false negative) errors in the identification of anomaly associated with threats to information security in a user's device.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Exemplary aspects are described herein in the context of a system, method, and a computer program for protecting devices of a user by modifying information security settings based on types of anomaly in accordance with aspects of the present disclosure. Those of ordinary skill in the art will realize that the following description is illustrative only and is not intended to be in any way limiting. Other aspects will readily suggest themselves to those skilled in the art having the benefit of the disclosure. Reference will now be made in detail to implementations of the example aspects as illustrated in the accompanying drawings. The same reference indicators will be used to the extent possible throughout the drawings and the following description to refer to the same or like items.

The method of the present disclosure enables devices of a user to be protected from harmful software. The type of anomaly caused by the harmful software is determined and the information security settings of the user device are modified to avoid the possible harm. In addition, the method of the present disclosure reduces type I (false positive) and type II (false negative) errors in identification of an anomaly associated with threats to information security in the device of the user. In one aspect, the method of the present disclosure is implemented, in particular, with the aid of the computer device represented in FIG. 4.

In order to clearly describe the method of the present disclosure, the following terminologies are first provided below.

Internet of Things (IoT) refers to a computer network consisting of devices and physical objects ("things") equipped with built-in technology for interacting with each other or with the environment. For example, the Internet of Things includes portable devices, electronic systems of vehicles, smart cars, smart cities, industrial systems, and the like.

Industrial Internet of Things (IIoT) refers to advanced analytics equipment and platforms, connected to the Internet, and process data received from connected devices. IIoT devices vary widely, from small weather sensors to complex industrial robots. An exemplary definition is also found in other technical sources, e.g., https://www.hpe.com/ru/ru/what-is/industrial-iot.html.

Figure 1:
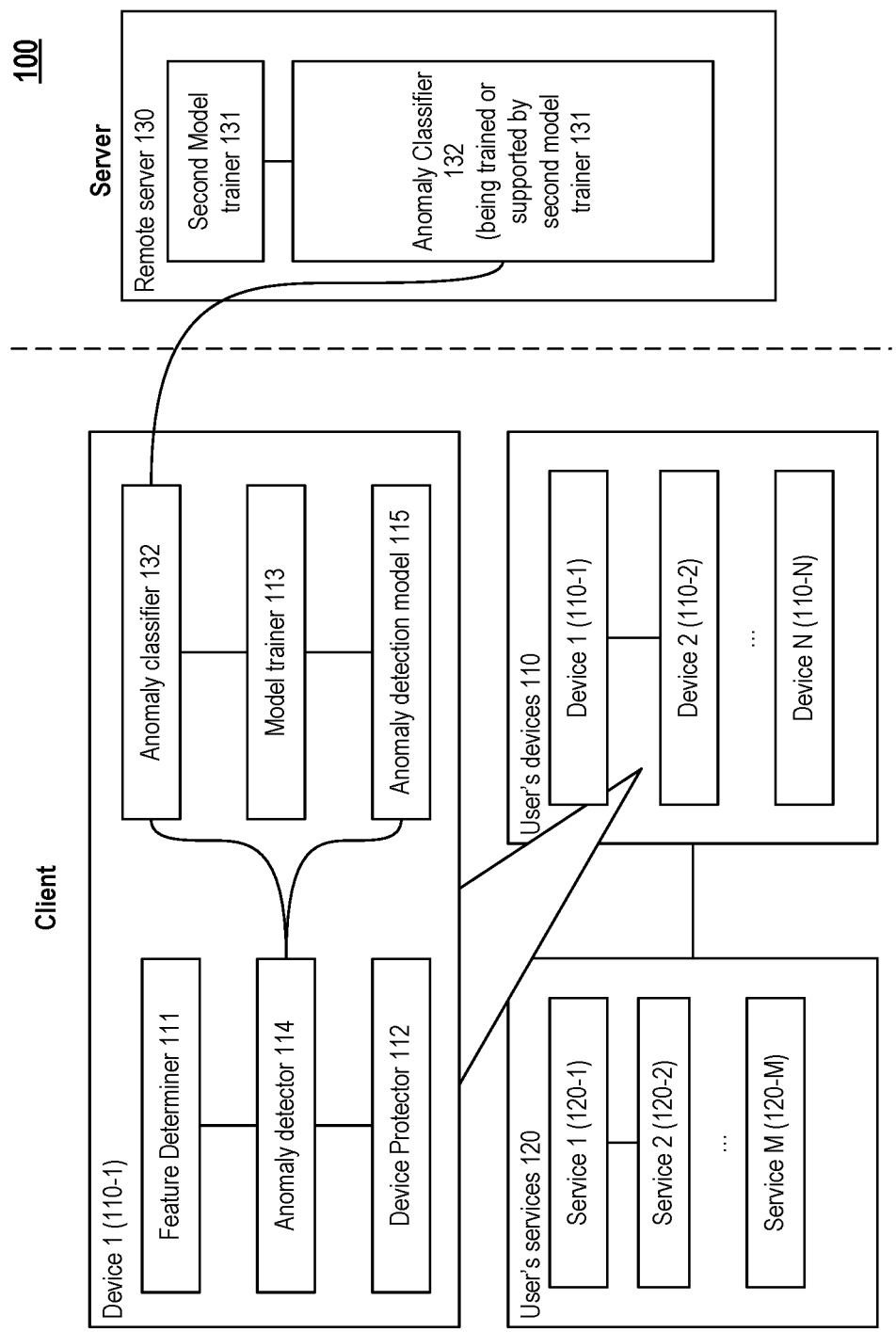
FIG. 1 illustrates a system for protecting a user's devices.

FIG. 1 illustrates a system 100 for protecting a user's devices. The system 100 is implemented on a computing system (e.g., a computer), that includes real-world devices, systems, components, and groups of components realized with the use of hardware such as integrated microcircuits (application-specific integrated circuits, ASICs) or field-programmable gate arrays (FPGAs) or, for example, in the form of a combination of software and hardware such as a microprocessor system and set of program instructions, and also on neurosynaptic chips. The functionality of such means of the system may be realized solely by hardware, and also in the form of a combination, where some of the functionality of the system means is realized by software, and some by hardware. In certain aspects, some or all of the components, systems, etc., may be executed on the processor of a general-purpose computer (such as the one shown in FIG. 4). Furthermore, the system components may be realized either within a single computing device or spread out among several interconnected computing devices. Thus, the system 100 may be realized using an appropriate hardware components and/or software modules, which may be arranged together or may reside at several locations or on several devices. The components and/or modules of the systems may then interact or exchange data by one or more wireless communication lines, wired communication lines, cellular communications, a client/server architecture, a peer-to-peer architecture, and so forth.

The system 100 includes a set of user's devices 110, a set of user's services 120, and a remote server 130. The set of user's devices 110 consists of at least two devices (N≥2). The user's devices are devices of any kind, for example smartphones, personal computers (PC), notebooks, routers, data storage systems, Internet of Things devices, smart watches, smart headphones, car modules, and the like. The user's devices 110 may also include Industrial Internet of Things devices, for example, if the user is an operator of such devices. In one aspect, feature determiner 111, device protector 112, and anomaly detector (identifier) 114 are installed in at least two devices 110. The model trainer 113 may also be installed in some of the devices 110. FIG. 1 shows, by way of example, the aforesaid modules installed in device 110-1.

The set of user's services 120 consists of at least one service (M≥1) and may include services and applications such as a calendar, an antivirus application, a call application, an email application, a web browser and the like. Access to the services is provided after the user has given the corresponding permission, via one or more user's devices 110 or a remote server 130.

In one aspect, the user's activity comprises an activity performed in real time or an activity that is scheduled (i.e., pre-scheduled).

In the present disclosure, a user's activity is taken to mean, in particular, a user's movement (change of location), a user's interaction with devices, a user's interaction with services (for example, interaction with an email application on a phone), or the interaction of devices or services with each other (for example, the installation of a new application on a device, or a data exchange between devices).

Similarly, a user's scheduled activity is taken to mean a user's activity which is expected at a moment of time later than the moment of time when the information about the scheduled activity was received. Scheduled activity therefore includes, in particular, planned movements of the user, planned interaction of the user with devices, planned interaction of the user with services, and planned interaction of devices or services with each other.

The feature determiner 111 is used for determining values of the features (also characteristics) of a user's activity (referred to hereafter as "features") performed using the set of user's devices 110.

In one aspect, the feature activity further includes features of scheduled activity, wherein values of the feature activity are obtained from a set of the user's services 120. The aforesaid features comprise numerical features of user's activity and correspond to the scheduled activity of the user.

In one aspect, the features include one or more of the following:
a) the interaction of a device with a server;
b) the connection of new devices to the user's devices network;
c) the number of new devices connected to the user's devices network;
d) access to the resources of a device (memory, processor, etc.);
e) the list of resources that are accessed;
f) the features of a device;
g) the transmission of data;
h) the type of data to be transmitted (for example, commands, raw data, encrypted data, etc.);
i) antivirus events, such as the detection of a harmful file, the switch-off of self-protection, an unsuccessful renewal attempt and other events in the antivirus system and antivirus modules (see FIG. 2); and
j) the type of activity of the user.

In one aspect, the type of user's activity includes at least one of the following:
a) the presence of a specific location;
b) driving a vehicle;
c) interaction with at least one of the user's devices; and
d) interaction with new devices.

The anomaly detector 114 is designed to detect anomalies indicative of a threat to information security, by using a trained anomaly detection model 115 whose inputs are the values of the features. "Threat to information security" is taken to mean any disruption or attempted disruption of the information security of a device, e.g., an unauthorized access to a user's data, a fraud, a loading or running of harmful software, or any other threat.

After detecting an anomaly, the anomaly detector 114 identifies the type of detected anomaly and the device which is the source of the anomaly. In one aspect, the type of detected anomaly is identified using a trained anomaly classifier 132 whose inputs are the determined values of the features.

In one aspect, the device protector 112 is designed to modify the information security settings in a specified device according to a specified type of anomaly.

In one aspect, the modification of the information security settings of a device features includes one or more of the following:
  a) performing antivirus checking using up-to-date databases;
  b) modifying the network parameters;
  c) limiting the functionality of the device;
  d) limiting the interaction of the device with other devices;
  e) limiting access to the resources of the device;
  f) switching on multi-factor authentication;
  g) renewing the device protector on the device in which the anomaly has been identified; and
  h) receiving feedback on the results of the methods described above.

In one aspect, the type of anomaly is one of the following:
  a) harmful software;
  b) data leakage;
  c) unauthorized input;
  d) unauthorized access to at least a device, a service, or data;
  e) compromise of a device;
  f) connection to a botnet command center;
  g) encryption of a user's data; and
  h) another type.

The modification of the information security settings is carried out according to the type of anomaly identified, for example, in accordance with rules drawn up in advance for modifying information security settings. The aforesaid rules determine the modifications of the information security settings corresponding to an identified type of anomaly. In one aspect, the aforesaid rules may be determined in advance by information security specialists on a remote server 130 and transmitted to the user's devices 110.

In another aspect, a machine learning model may be used to identify the optimal modifications of the information security settings (not shown in the figure). The machine learning model receives the type of anomaly, in particular, as its input, and selects, from among the modifications of the information security settings, the modifications that provide the best protection for the devices.

In one aspect, the aforesaid machine learning model for identifying the optimal modifications of information security settings may be trained on an another fourth training sample containing examples of the application of the aforesaid rules, and subsequent analysis of the results of the application of the rules to data from the devices of a number of users. Where mentioned results were obtained after aforesaid rules were applied. In one aspect, mentioned results may contain the degree of protection for the devices to which aforesaid rules were applied, e.g. whether the degree of protection of corresponding device were increased or decreased after applying corresponding rule. In another aspect, mentioned results may contain quality metrics like type I and type II errors etc. for known anomalies that were detected after applying the rules. The process of training the model for identifying the optimal modifications of the information security settings may take place either on the remote server 130, or on the user's devices 110. The model for identifying the optimal modifications of the information security settings may be supported. In one aspect, the supporting is performed by retraining with adding new rules. In another aspect, the supporting is performed after specified time intervals, by receiving new data on the application of the aforesaid rules to the user's devices and data on the level of protection of the user's devices after the corresponding rules have been applied. In one aspect, the aforesaid model for identifying the optimal modifications of information security settings also receives, as its input, information about identified devices which are a source of the identified anomaly (for example, an identifier of a device or of a type of device, or other identifiers). In another example, the aforesaid model for identifying the optimal modifications of information security settings also receives, as its input, the determined values of features.

In one aspect, the device protector 112 is also used to modify the information security settings of other user devices.

In one aspect, the other user devices that are to be modified comprise devices relating to an identified device, devices having a same owner, devices having similar features, and so on. For example, the protection of devices within a single network is strengthened. In the present disclosure, a "link between devices" is taken to mean a state of the devices as a result of which actions performed on one device may be reflected in at least one of: operations of another device, data on another device, or operations of services on another device. For example, a link may consist in the exchange of data between devices, the connection of devices to a single network, or the presence of common services installed on the aforesaid devices.

The model trainer 113 is used for the training and supporting of an anomaly detection model 115 according to the data in the training sample, including the values of features over a historical period of observation (a week or a month, for example). It should be noted that supporting of machine learning model, in the present disclosure, is taken to mean retraining of the model, i.e. repeated training of the model on new data or with the use of new parameters of the model. Additionally, supporting of machine learning model is taken to mean repeated training of the model, using a new model specification; for example, a change from a neural network to logistic regression for the anomaly detection model 115. The training sample is formed by the model trainer 113 based on data received from the feature determiner 111 and data received from the anomaly detector 114, the received data being for the historical period of observation. After training or supporting of the machine learning models (i.e., training the anomaly detection model 115 and the anomaly classifier 132), the model trainer 113 transmits the trained models to the anomaly detector 114.

In one aspect, the supporting of the models is performed periodically, for example once per month. If the user has a large number of devices, a larger number of events, and a correspondingly larger number of features, will be determined. In this case, the model for this user will be supported more frequently (once per week, for example) than the model for another user who has a smaller number of devices (once per month).

In yet another aspect, the supporting takes place when either a new user device is added or a new user service is added, wherein the new user service is a service to which the user's device is connected.

In yet another aspect, a number of models may be used. The new model is trained when a new device or service is added.

In yet another aspect, it is possible to use an online learning (or "online machine learning") method in which the data become available in consecutive order and are used to renew the model parameters for data arriving in the future, at each step. That is to say, the model is supported dynamically whenever new data is received. This approach provides a better way of allowing for modifications in the user's behavior, and correspondingly in the new features of the user's activity.

In one aspect, the model trainer 113 is also used for the training and supporting of an anomaly classifier 132 on data in a second training sample, wherein the data includes the groups of values of features which are formed based on data received from the feature determiner 111, the data being for a second historical period of observation (a week or a month, for example). The aforesaid sample for each group of values of features includes values of the type of anomaly and the device which is the source of the anomaly.

Thus, the anomaly classifier 132 is used for classifying anomalies into classes determined by values of the type of anomaly and the device which is the source of the anomaly. The second training sample therefore includes labeled data according to the classes of anomalies. In addition, aspects of the method of the present disclosure that can be used for anomaly detection models 115, particularly for online training, may be used for the training and supporting of the anomaly classifier 132.

In one aspect, the anomaly detector 114 receives a trained anomaly classifier 132 from a remote server 130. A second model trainer 131 is located on the remote server 130 and is used for the training and supporting of the anomaly classifier 132 on the data of a third training sample. Here, the third training sample is formed by the second model trainer 131 based on data from the feature determiner 111 of the user's devices gathered over a second historical period of observation (a month or year, for example).

In one aspect, the data gathered over the second historical period of observation includes, for each group of values of features, groups of values of features for at least two users and classes which are determined by the values of the type of anomaly and of the device, wherein the device is the source of the anomaly.

In one aspect, the anomaly detection model 115 and the anomaly classifier 132 are tested on the data of a test sample and validated using a validation sample. The testing and validation may be performed using the model trainer 113 or the second model trainer 131. The test and validation samples also include the values of features over a historical period of observation, where the threat to information security due to the anomaly, and the devices in which the anomaly appeared, are known for at least a specified portion of the values of the features. In this case, the third training sample is formed by the model trainer 113 or by the second model trainer 131 based on data from the feature determiner 111 and data from the anomaly detector 114 of the user's devices. The data is gathered over the first historical period of observation or over the second historical time interval. After the training or supporting of the machine learning models (i.e., training the anomaly detection model 115 and the anomaly classifier 132), the model trainer 113 transmits the trained models to the anomaly detector 114. In this context, known approaches to the formation of test and validation samples may be used. For example, the initial training sample may be divided into training, test and validation samples, in the proportions of 60%, 20% and 20% respectively. Thus, in this example, only 60% of the examples of the initial training sample will be used for training the model.

For testing the trained anomaly detection model 115, or the anomaly classifier 132, respectively, any of the quality metrics known to those ordinarily skilled in the relevant art may be used. For example, the quality metrics may be the NAB metric, the F1 metric, the MAPE metric, the accuracy (proportion of true predictions), the precision (proportion of true predictions that have been confirmed), the recall metric, the type I error and type II error, and other metrics. It should be noted that a quality metric is chosen, in particular, in accordance with the anomaly detection model 115 or the anomaly classifier 132 to be used. Based on the results of the aforesaid testing and validation, the anomaly detection model 115 is supported in accordance with technical approaches known by those ordinarily skilled in the relevant art. Regardless of the approach, the goal is to achieve the requisite values of the chosen quality metrics.

In one aspect, in supporting of the model, it is possible to modify the model parameters, the user's activity features used in the model, and the parameters for the regularization of the model if regularization is used; to add (or remove, or modify) the neural network layers if the model is a neural network; to increase the volume of the training sample; or to use other approaches. The supporting of the model may continue until the aforesaid values of the quality metrics are reached (for example, when the number of type I and type II errors do not exceed 0.1%). Thus, the supporting of the model enables reduction of the type I and type II errors in identification of an anomaly associated with an information security threat in the user's devices.

The anomaly detection model 115 may be based on any machine learning model known by those ordinarily skilled in the relevant art. Some possible anomaly detection models 115 are mentioned below. However, the present disclosure is not limited to the exemplary models described herein, and other known anomaly detection models 115 may be used in implementing the method and system of the present disclosure.

If the training sample contains a small number of examples indicative of information security threats (that is to say, the number of examples indicative of anomalies is, for example, less than 10 or less than 1% of the total number), then an anomaly detection model 115 may be used, provided that the features of the training sample fit the Gaussian distribution. In this case, the sample means and sample variances will be evaluated for each feature based on the training sample data, after which the joint distribution probability density will be calculated. Finally, if the probability value evaluated based on the new data is found to be below a specified threshold (a specified distribution quantile), then an anomaly will be identified. The device in which the anomaly is identified may then be identified according to the smallest value of probability density for the corresponding activity features obtained from the device concerned. In this case, the test and validation samples will contain an insignificant number of examples indicative of the information security threat (anomaly), this number being sufficient for the determination of the model quality and subsequent correction of the model parameters to maximize the model quality. It is also possible to use time series models, such as ARIMA, ARIMAX or others, as anomaly detection models 115.

When the training sample contains a large number of examples containing information security threats (in other words, examples with anomalies), then classification models, such as logistic regression, neural networks, decision trees, decision forests, the support vector method, the nearest neighbors method, or others, may be used. This anomaly detection model 115, based on a machine learning model for classification, will classify the activity of a user as either anomalous or expected.

In one aspect, the anomaly detection model 115 contains a set of models, that is to say a group, that makes decisions by averaging the results of the operation of individual models in the set. In another aspect, a neural network is optimized by using genetic algorithms. In yet another aspect, a neural network is chosen by using one of the quality metrics, such as the NAB metric or the F1 metric.

In one aspect, the construction of the anomaly detection model 115 by the model trainer 113 takes place as follows.

Firstly, a template for the architecture of a neural network is chosen. For example, this may be a multi-layer perceptron, a recurrent neural network, or another type. Then, a description of the chosen architecture is created, including:
the optimizer and its parameters;
the initial values of the weighting coefficients and shifts;
the maximum number of layers; and
for each layer:
a list of possible types of layer consisting of at least the subset of the following layers: Dense, Convolutional, GRU, LSTM, Dropout;
the activation function: linear, ReLU, Tan h, sigmoid, Softmax or other; and
the possible layer size (number of neurons in the layer).

In one aspect, an optimizer is then used to optimize the architecture of the neural network. In a particular aspect, the architecture of the neural network is optimized using genetic algorithms. A quality metric is also used to select the best architecture. In one aspect, a quality metric, for example an NAB metric or an F1 metric, is used.

The model trainer 113 is also used to obtain feedback from the user of the device 110. The feedback includes a confirmation or a rejection of the identified anomaly. Subsequently, the feedback information is included in training samples, i.e., for supporting of the anomaly detection model 115. Thus, the supporting of the model enables reduction of the type I and type II errors in the identification of an anomaly associated with information security threats in the user's devices.

The chosen anomaly classifier 132 may be based on any machine learning model known by those skilled in the related art. Thus, any standard machine learning model may be used for performing classification tasks in realizing the method of the present disclosure. Therefore, the examples of models for performing classification tasks given above may also be used as anomaly classifiers 132. In particular, models such as logistic regression, neural networks, decision tree, decision forest, support vector method, nearest neighbors method, or other models may be used.

Figure 2:
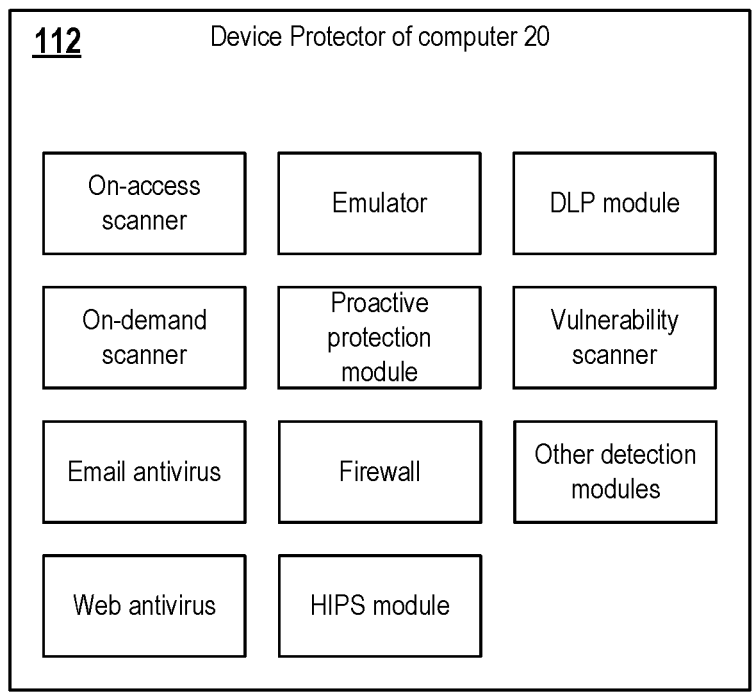
FIG. 2 illustrates exemplary modules of device protector of a computer.

FIG. 2 illustrates exemplary modules of a device protector 112 of a device, e.g., a computer 20. The device protector 112 (antivirus or other protection means) of the device may contain modules designed to ensure the security of the device, namely an on-access scanner, an on-demand scanner, an email antivirus, a web antivirus, a proactive protection module, a HIPS (Host Intrusion Prevention System) module, a DLP (Data Loss Prevention) module, a vulnerability scanner, an emulator, a firewall, and others. In one aspect, the aforesaid modules may be a constituent part of the device protector 112. In another aspect, these modules may be implemented in the form of individual software components.

An on-access scanner contains functionality for identifying harmful activity in all openable, executable and storable files in the user's computer system.

An on-demand scanner differs from an on-access scanner in that it scans files and directories specified by the user, e.g., at the user's request.

An email antivirus is used for controlling incoming and outgoing emails by checking the emails to determine whether or not they contain harmful software.

A web antivirus is used to prevent the execution of harmful code that may be present on web sites visited by the user, and for blocking the opening of such web sites.

A HIPS module is used for identifying any undesired and harmful activity performed by software programs and to block the activity at the time of execution.

A DLP module is used for identifying and preventing leakage of confidential data beyond the boundary of the computer or network.

A vulnerability scanner is used for identifying vulnerabilities in a device (for example, if some components of the device protector 112 are switched off, if virus databases are not up to date, if a network port is closed, etc.).

A firewall is used for controlling and filtering network traffic according to specified rules.

An emulator operates by imitating a guest system during execution of file instructions in the emulator and subsequently examining details of data gathered during the executions of the file instructions.

A proactive protection module is used for identifying the behaviors of executable files using behavioral signatures, and for identifying their classification in accordance with associated confidence levels.

Figure 3:
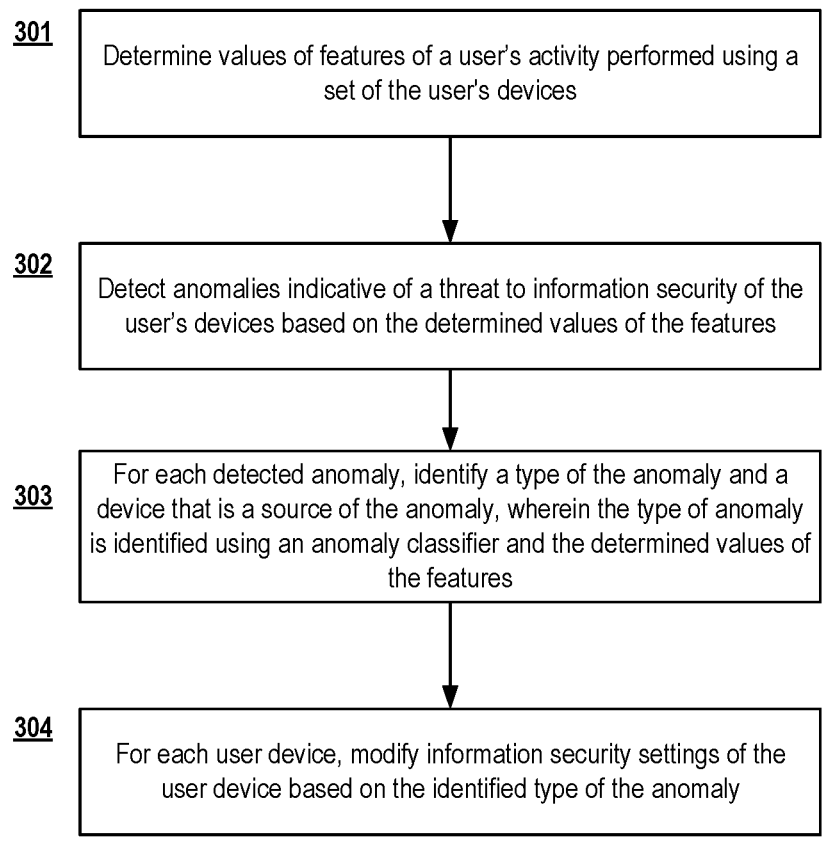
FIG. 3 illustrates an exemplary method for protecting devices of a user by modifying information security settings based on types of anomaly.

It should be noted that the device protector 112 may also include other modules for the implementation of the functionality described in FIG. 1 and FIG. 3.

Figure 4:
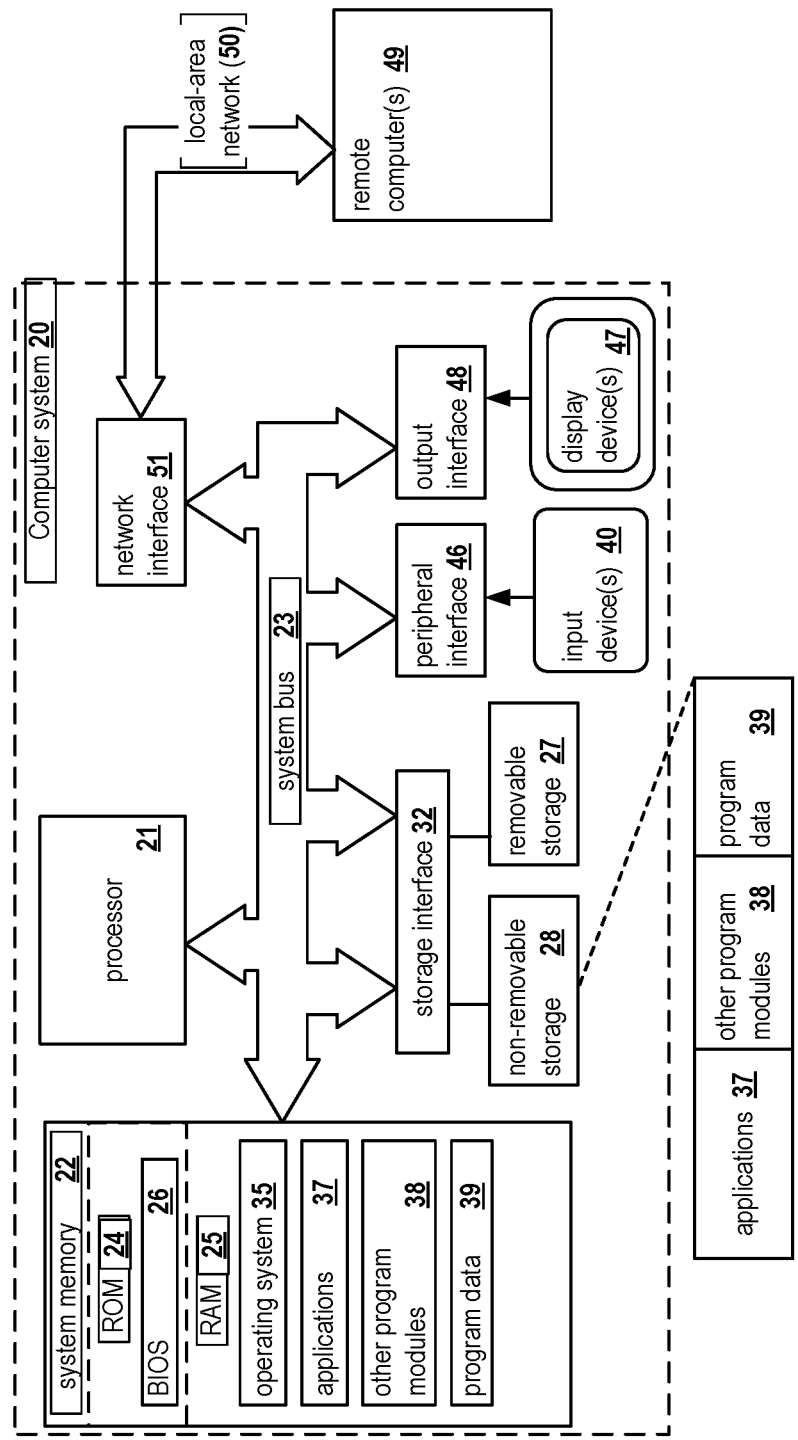
FIG. 4 presents an example of a general purpose computer system on which aspects of the present disclosure can be implemented.

FIG. 3 illustrates an exemplary method 300 for protecting devices of a user by modifying information security settings based on types of anomaly. The various modules for protecting user devices may be installed in a computing device, e.g., as shown in FIG. 4. Moreover, any number of computing devices may be interconnected to provide the protection to the user devices.

In step 301, method 300, determines, by the feature determiner 111, values of features of a user's activity performed using a set of the user's devices.

In one aspect, the user's activity comprises at least one of: a presence at a specific location, a user's movement changing a physical location of the user, a driving of a vehicle, a user's interaction with any number of the user's devices, an interaction with at least one new device, a user's interaction with any number of user's services, an interaction of a user device or a user service with any other user device or user service, and a data exchange between any number of the user devices.

In one aspect, the features include one or more of: an interaction of a device with a server, a connection of a new device to a network of the user's devices, a number of new devices connected to the network of the user's devices, an access to resources of one of the user's device, the resources including at least a memory or a processor, a list of resources of one of the user's device that are accessed, a feature of a particular user device, a transmission of data to or from a user device, a type of data to be transmitted, the type of data including at least one of a command, raw data or encrypted data, any number of antivirus events, and a type of activity of the user.

In one aspect, the features further include features of a scheduled activity, wherein values of the feature of the user's activity are obtained from a set of the user's services.

In step 302, method 300, by an anomaly detector 114, detects anomalies indicative of a threat to information security of the user's devices 110. In one aspect, the anomaly detection is performed using a trained anomaly detection model 115 whose inputs are the values of the features determined in step 301.

In one aspect, the threat to information security includes at least a disruption or an attempted disruption to information security of a device, wherein the disruption or attempted disruption is accomplished by at least one of: an unauthorized access to a user's data, a fraud, and a loading or running of harmful software.

In step 303, method 300, by the anomaly detector 114, identifies, for each anomaly detected in step 302, a type of the anomaly and a device that is a source of the anomaly, wherein the type of anomaly is identified using an anomaly classifier, e.g., a trained anomaly classifier 132. In one aspect, the inputs to the anomaly classifier comprise values of the features determined in step 301.

In step 304, method 300, by a device protector 112, modifies information security settings of the user device based on the identified type of the anomaly.

The model trainer 113 is used for the training and supporting further training of an anomaly detection model 115 according to the data in the training sample, including the values of features over a historical period of observation.

In one aspect, the anomaly detection model 115 and the anomaly classifier 132 are tested on the data of a test sample and validated using a validation sample. The testing and validation may be performed using the model trainer 113 or the second model trainer 131. The test and validation samples also include the values of features over a historical period of observation, where the threat to information security due to the anomaly, and the devices in which the anomaly appeared, are known for at least a specified portion of the values of the features.

In one aspect, the model trainer 113 is also used for the training and further supporting of an anomaly classifier 132 on data in a second training sample, wherein the data includes the groups of values of features which are formed based on data received from the feature determiner 111, the data being for a second historical period of observation.

In one aspect, the anomaly detector 114 receives a trained anomaly classifier 132 from a remote server 130. A second model trainer 131 is located on the remote server 130 and is used for the training and further supporting of the anomaly classifier 132 on the data of a third training sample. In this scenario, the third training sample is formed by the second model trainer 131 based on data from the feature determiner 111 of the user's devices gathered over a second historical period of observation.

In another aspect, a machine learning model may be used to identify the optimal modifications of the information security settings (not shown in the figure). The machine learning model receives the type of anomaly, in particular, as its input, and selects, from among the modifications of the information security settings, the modifications that provide the best protection for the devices.

In one aspect, the method further comprises: modifying, by the device protector, information security settings of other user devices, wherein the other user devices that are modified comprise at least one of: devices relating to an identified device, devices having a same owner, and devices having similar features. In one aspect, the device protector modifies the information security settings in a specified device according to a specified type of anomaly based on the determined values of the features, wherein the modification includes at least one of: performing antivirus checking using up-to-date databases, modifying network parameters, limiting any number of functionalities of the device whose information security settings are being modified, limiting interactions of the device with other devices, limiting access to the resources of the device, switching on multi-factor authentication for the device, renewing a device protector on the device in which the anomaly has been identified, and receiving feedback on results of modifications of information security settings that are already performed for the device.

It should also be noted that, for the sake of simplicity, the various modules of the present disclosure including at least, the feature determiner 111, the device protector 112, the model trainer 113 and anomaly detector 114 are described as if they are in a single element of the disclosure. However, the various modules 111-114 may be installed in two or more of the user's devices 110. The features are determined in all the devices 110, wherein each of the devices 110 contain data required for the formation/determination of said features. Accordingly, the feature determiner 111 is installed in these devices 110.

In one aspect, if a feature determiner 111 is not installed in any user device 110, then the data from this device can still be used for determining the features. This can be done if the aforesaid device is linked to another device in which a feature determiner 111 has been installed. For example, the modules 111-114 may not be present in a user's smart watch but may be present in a user's smartphone. If the smart watch is connected wirelessly to the user's smartphone, in which the means 111-114 are installed, the data from the smart watch may still be used. In this example, it should be noted that, if an anomaly is detected in the user's smart watch itself, the modification of the information security settings of the smart watch may be such that the device protector 112 on the user's smartphone ceases to receive data from the smart watch, or restores the settings of the smart watch to the initial state, or upgrades the firmware of the smart watch—thereby to improve information security on the smart watch.

In a preferred aspect, the processing of the data (i.e., steps 302-303) takes place on one of the devices 110 (also known as the user's lead device). After the identification of an anomaly, the aforesaid lead device notifies the device protector 112 on the device on which the anomaly was detected, the notification indicating that the information security settings on this device must be modified.

In another aspect, some or all of steps 302-303, are executed on the remote server 130. In another aspect, the model training process is also executed on the remote server 130. For example, in one aspect, a second model trainer 131 may train an anomaly classifier 132 on the data received from the devices 110 of a plurality of different users. Thus, by using the capacity of the remote server 130, the quality of the anomaly classifier 132 can be further improved. Without limiting the generality of the foregoing, the remote server 130 may be considered to be one of the user's devices 110, since in the example considered here the user interacts with the remote server 130 by transmitting and receiving data.

In yet another aspect, steps 302-303, as well as the model training process, may take place in some or all of the user devices 110 in which corresponding model trainer 113 and anomaly detector 114 are installed.

In one example, some or all of steps 302-303, as well as the model training process, are executed on all the devices 110 at the same time. In this case, the anomaly detector 114 on each of the devices 110 identifies the type of anomaly and the device on which the anomaly was identified (to be precise, the device 110-1). Thus, if the device protector 112 on the device 110-1 on which the anomaly was identified ceases to operate correctly, then the device protector 112 of the other devices 110 modifies the data protection settings of the other devices 110. For example, this may be done by isolating the compromised device, disconnecting it from the user's network and services, changing the passwords for the user's services, or carrying out a forced refresh of the device protector 112.

In another example, some or all of steps 302-303, as well as the model training process, may be executed on some of the user's devices 110. For example, this may be done on those devices that are in an inactive state at the time of execution of steps 302-303, and at the time of the model training process. Thus, this reduces the workload on the computing resources of devices 110 with which the user is interacting at the time of execution of steps 302-303. For example, if the user has access to a smartphone, a home PC, a notebook and a router, then when the user is at work, the method may perform steps 302-303, as well as the model training process on the home PC.

In another aspect, the model trainer 113 is used for training the anomaly detection model 115 during the downtime of the device on which the aforesaid model trainer is installed.

Some examples of the operation of the claimed system and method, shown in FIG. 1 and FIG. 3, are considered below. In the examples considered here, the values of the user's activity features and of the scheduled user's activity features are determined at each moment of a specified time interval. For example, this may be done every hour for three hours, etc.

Example 1

In the first example, the values of the following user's activity features were determined over a first time interval (from 00:00 to 20:00 on the current day).

TABLE 1

| Feature | Source |
| --- | --- |
| User's location | User's smartphone |
| Interaction of the device with a server | All devices |
| Connection of new devices to the network of the user's devices | All devices |
| Number of new devices connected to the network of the user's devices | All devices |
| Access to resources | All devices |
| List of resources accessed | All devices |
| Features of device | All devices |
| Data transmission | All devices |
| Type of data to be transmitted | All devices |
| Type of user's activity | All devices |

The above features will be determined for all the devices 110 (except for the "user's location" feature). The total number of activity features will therefore depend on the number of the user's devices 110. Table 1 does not show the values of the features, as they may vary during the first time interval.

In another example, the values of the following scheduled activity features were determined over the second time interval (from 20:00 to 21:00 on the current day) based on data from the "calendar" service.

Table 2 illustrates an exemplary table which includes, the feature of the scheduled activity, sources, and the corresponding value.

TABLE 2

| Feature | Source | Value |
| --- | --- | --- |
| Scheduled location of the user | "Calendar" service | Outside the home |

Table 3 illustrates the values of the activity features that are determined over the second time interval (20:00-21:00).

TABLE 3

| Feature | Source | Value |
| --- | --- | --- |
| User's location | User's smartphone | Outside the home |
| Interaction of home PC with server | Home PC | Yes |
| Connection of new devices to the home network | Home router | Yes |
| Number of new devices connected to the home network | Home router | 1 |
| Access to resources of home PC | Home PC | No |
| Interaction of smartphone with server | Smartphone | Yes |
| Access to resources of smartphone | Smartphone | Yes |
| . . . | | |

The content of Table 3 shows that the values of user's activity features over the second time interval confirms the user's presence outside the home and the interaction with the smartphone. However, activities among the devices 110 of the user's home network (home PC, home router) were also recorded. Thus, the anomaly detector 114 detects an anomaly using the trained anomaly detection model 115.

Then, using the trained anomaly classifier 132, the anomaly detector 114, identifies the device 110 on which the anomaly has been detected, namely a home PC and a home router; it also identifies the type of anomaly, namely unauthorized access to one or more of the user's devices 110. Finally, the device protector 112b modifies the information security settings on each identified device 110. For example, access to the PC resources is limited, the unknown device connected to the router is blocked, and/or a second authorization factor is activated for accessing the PC (e.g., by phone).

Example 2

In the second example, the features shown in Table 4 are determined. Thus, over the first time interval (19:00-20:00) the user's location was his/her workplace, where he/she interacted with a smartphone, but did not interact with other devices 110 or a range of services 120 (smart headphones, car, home PC, notebook, email service). Over the second time interval (20:00-21:00), the user's location was "driving car", and the values of the other features are shown in the table. The values of the scheduled activity features are determined over the third time interval (21:00-22:00); in the present example, the feature is "scheduled location of the user". From the data of the "calendar" service, it was determined that the user would be at home during the second time interval.

TABLE 4

| Feature | Source | Values over the first time interval (19:00-20:00) | Values in the second time interval (20:00-21:00) | Scheduled values over the third time interval (21:00-22:00) |
|---|---|---|---|---|
| Scheduled location of the user | "Calendar" service | | | Home |
| User's location | User's smartphone | Work | Driving car | |
| Interaction of user with smartphone | Smartphone | Yes | Yes | |
| Interaction of user with smart headphones | Smart headphones | No | Yes | |
| Connection of headphones to smartphone | Smartphone, smart headphones | No | Yes | |
| Interaction of user with car | ECU of car | No | Yes | |
| Interaction of user with home PC | Home PC | No | No | |
| Interaction of user with notebook | Notebook | No | Yes | |
| Uses of email service | Smartphone/notebook on which the email service is installed | Yes | Yes (via notebook) | |
| ... | | | | |

As shown in Table 4, the value of the location feature over the second time interval matches the value of the location feature over the first time interval and the "scheduled location" feature over the third time interval. At this time, the "interaction of user with notebook" and "use of email service" feature appear anomalous, since the user is driving a car. Thus, the device protector 112 identifies an anomaly according to the trained anomaly detection model 115. The anomaly classifier 132 is then used to identify the device (notebook) on which the anomaly was detected. Then, the user's interaction with the notebook and his/her interaction with the email service via the notebook (sending a message, for example) are recorded. The type of anomaly, namely unauthorized access to the notebook, will also be identified, and therefore the device protector 112 modifies the information security settings of the notebook. For example, the modification may be performed by switching on a second authorization factor, performing an antivirus checking with strengthened protection parameters, and the like.

It should be noted that a small number of activity features over a short time interval is given in the examples considered here, in order to illustrate the operation of the invention. In practice, these features may be numbered in thousands or even hundreds of thousands. In a second example, additional scheduled activity features, namely "timetabled switching of notebook to sleep mode" and "message sending postponed", may be included. If the values of these additional features indicate the switching of the notebook to sleep mode, and the message sending is also postponed during the second time interval, then the anomaly detector 114 does not identify an anomaly in the event that the interaction with the notebook was recorded and the message was sent at the time when the user was at the wheel of the car, because these actions were expected. It should also be noted that the "house"/"work" values of the location feature shown in the examples have been provided to facilitate the understanding of the example. In reality, the location feature may take coordinate values or values from a location list ("location 1", "location 2", and so on).

In one aspect, a list of possible user locations may be obtained by clustering the user's locations over a specified period, using clustering methods (such as the k-average method or others).

In another aspect, the method further includes anonymizing the determined features in order to protect the user's data.

Example 3

In a third example, the user was at work in the first time interval (19:00-20:00). Interaction with the smartphone was recorded, but there was no interaction with the user's home devices 110 (router, Home PC). According to the data from the "calendar" and "call application" services 120, it was found that the user would be at home in the second time interval (21:00-22:00), and an event with a large number of users (guests, for example) was expected, as reflected in the values of the features over the second time interval (21:00-22:00).

Table 5 illustrates the activity features that were determined according to the logic of example 3, as described above.

TABLE 5

| Feature | Source | Values over the first time interval (19:00-20:00) | Values over the second time interval (21:00-22:00) |
|---|---|---|---|
| Scheduled location of the user | User's smartphone/"calendar" service | | Home |
| Scheduled events of user | "Calendar" service, calls application | — | Event with large number of users |
| User's location | User's smartphone/"calendar" service | Work | Home |
| Interaction of user with smartphone | Smartphone | Yes | Yes |
| Connection of new devices to the router in the home network | Router | No | Yes |
| Number of devices connected to home network | Router | 0 | 10 |
| Interaction of user with home PC | Home PC | No | Yes |
| ... | | | |

It should be noted that conventional antivirus solutions in such a situation might identify an anomaly and block access to the home network for new devices 110. However, the present invention does not identify an anomaly. Rather, the machine learning model, having been trained on a large number of scheduled activity features will determine that the connection of 10 new devices 110 to the router is not an anomaly. In particular, the machine learning model learns that the features indicating that an event with a large number of users is planned during the second time interval. Thus, the method of the present disclosure avoids a false positive in which an anomaly is falsely detected. As such, the method of the present disclosure enables the number of false positives to be reduced.

At the same time, in the third example, if the additional activity features "interaction with email", "interaction with bank website", "transmission of unknown files over the network" take the value 1 (that is to say, they confirm the interaction with email and with the bank website, and the transmission of unknown files over the network), then the anomaly detector 114 identifies an anomaly, since the aforesaid features indicate a compromised device of a new user (guest) connected to the home network router. Consequently, an unknown harmful file may enter the user's device 110 from the guest's device. In this case, the anomaly detector 114 will identify the devices 110 in which an anomaly has been recorded and will modify their information security settings. If the email and bank website were accessed from the home PC, the device protector 112 installed in the home PC will exclude the guest's device from the list of trusted devices and will switch on additional authorization factors.

It should be noted that the examples described may not be identified as anomalies by antivirus solutions ordinarily known is the art. For example, a harmful application using a zero-day vulnerability may have penetrated the user's PC beforehand. During the user's absence, the aforesaid harmful application may have sent requests to a remote server which is not listed in the harmful server databases. Therefore, by using the user's activity features as well as the user's scheduled activity features, it will be possible to detect the anomalies described here that are associated with an information security threat. In addition, using two machine learning models one for anomaly identification and another for anomaly classification reduces the type I and type II errors in the detections and classifications of anomalies.

It should also be noted that the user's activity features, scheduled activity features, and time intervals chosen in the examples provide a good illustration of the anomaly, the type of anomaly, and the device that is the source of the anomaly. In reality, however, this association may be imperceptible to an information security specialist. This is because the number of features may reach hundreds of thousands, taking different values at each moment. In the present disclosure, therefore, machine learning models are used for identifying an anomaly associated with an information security threat in the user's devices 110, and subsequently for identifying the type of anomaly and the device that is the source of this anomaly.

Thus, it follows from the description of the system and method for protecting a user's devices, and from the examples presented above, that the claimed method of the present disclosure resolves the stated technical problem and enables the claimed technical results to be achieved. More precisely, the claimed method and system improve the level of protection of a set of user's devices and reduce the type I and type II errors in identifications of anomalies associated with information security threats to user devices.

FIG. 4 is a block diagram illustrating a computer system 20 on which aspects of systems and methods for protecting devices of a user based on types of anomaly may be implemented. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet. Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some aspects, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system (such as the one described in greater detail in FIG. 4, above). Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for protecting user's devices based on types of anomalies, the method comprising: determining, by a feature determiner, one or more values of features of a user's activity performed using at least one of the user's devices; detecting, by an anomaly detector, anomalies indicative of at least one threat to information security of the user's devices based on the one or more values of the features, wherein the detection is performed using a trained anomaly detection model; for each detected anomaly, identifying, by the anomaly detector, a type of anomaly and at least one device that is a source of the anomaly, wherein the type of anomaly is identified using an anomaly classifier and the one or more values of features, wherein the identification of the type of anomaly is performed using a trained anomaly classifier, wherein the trained anomaly detection model and the anomaly classifier are tested on data of a test sample and are validated using a validation sample, the testing and the validation being performed using a model trainer, the test and the validation samples further including values of features over a historical period of observation, and wherein the threat to information security due to the anomaly and the devices in which the anomaly appeared are known for at least a specified portion of the values of the features; and for each user's device, modifying, by a device protector, one or more information security settings of a user's device based on the identified type of the anomaly.

2. The method of claim 1, wherein the detection of the anomalies is performed using the trained anomaly detection model whose inputs are the determined one or more values of features.

3. The method of claim 1, wherein inputs to the anomaly classifier comprise the determined one or more values of features.

4. The method of claim 2, wherein the model trainer is used for training and/or supporting of the anomaly detection model according to data in a training sample, including at least the values of features over the historical period of observation.

5. The method of claim 4, wherein the model trainer is further used for the training and further supporting of the anomaly classifier on data in a second training sample, wherein the data includes groups of values of features which are formed based on data received from the feature determiner, the data being for a second historical period of observation.

6. The method of claim 5, wherein the anomaly detector receives the trained anomaly classifier from a remote server, wherein a second model trainer is located on the remote server and is used for the training and further supporting of the anomaly classifier on the data of a third training sample, the third training sample being formed by the second model trainer based on data from the feature determiner of the user's devices gathered over a second historical period of observation.

7. The method of claim 1, wherein a machine learning model is used to identify an optimal modification of the one or more information security settings, wherein the identification of the optimal modification comprises, receiving, as an input, the type of anomaly, and selecting, from among a plurality of modifications of the one or more information security settings, the modifications that provide the best protection for the devices.

8. The method of claim 1, wherein the user's activity comprises at least one of: a presence at a specific location, a user's movement changing a physical location of the user, a driving of a vehicle, a user's interaction with any number of the user's devices, an interaction with at least one new device, a user's interaction with any number of user's services, an interaction of a user device or a user service with any other user device or user service, and a data exchange between any number of the user devices.

9. The method of claim 1, wherein the one or more values of features include one or more of: an interaction of a device with a server, a connection of a new device to a network of the user's devices, a number of new devices connected to the network of the user's devices, an access to resources of one of the user's device, the resources including at least a memory or a processor, a list of resources of one of the user's device that are accessed, a feature of a particular user device, a transmission of data to or from a user device, a type of data to be transmitted, the type of data including at least one of a command, raw data or encrypted data, any number of antivirus events, and a type of activity of the user.

10. The method of claim 9, wherein the one or more values of features further include features of a scheduled activity, wherein values of the feature of the user's activity are obtained from a set of user's services.

11. The method of claim 1, further comprising:
modifying, by the device protector, one or more information security settings of other user devices, wherein the other user devices that are modified comprise at least one of: devices relating to an identified device, devices having a same owner, and devices having similar features.

12. The method of claim 1, wherein the threat to information security includes at least a disruption or an attempted disruption to information security of a device, wherein the disruption or attempted disruption is accomplished by at least one of: an unauthorized access to a user's data, a fraud, and a loading or running of harmful software.

13. The method of claim 1, wherein the device protector modifies the one or more information security settings in a specified device according to a specified type of anomaly based on the determined values of the features, wherein the modification includes at least one of: performing antivirus checking using up-to-date databases, modifying network parameters, limiting any number of functionalities of the device whose one or more information security settings are being modified, limiting interactions of the device with other devices, limiting access to the resources of the device, switching on multi-factor authentication for the device, renewing a device protector on the device in which the anomaly has been identified, and receiving feedback on results of modifications of the one or more information security settings that are already performed for the device.

14. A system for protecting user's devices based on types of anomalies, comprising: at least one processor configured to: determine, by a feature determiner, one or more values of features of a user's activity performed using at least one of the user's devices; detect, by an anomaly detector, anomalies indicative of at least one threat to information security of the user's devices based on the one or more values of the features, wherein the detection is performed using a trained anomaly detection model for each detected anomaly, identify, by the anomaly detector, a type of anomaly and at least one device that is a source of the anomaly, wherein the type of anomaly is identified using an anomaly classifier and the one or more values of features, wherein the identification of the type of anomaly is performed using a trained anomaly classifier, wherein the trained anomaly detection model and the anomaly classifier are tested on data of a test sample and are validated using a validation sample, the testing and the validation being performed using a model trainer, the test and the validation samples further including values of features over a historical period of observation, and wherein the threat to information security due to the anomaly and the devices in which the anomaly appeared are known for at least a specified portion of the values of the features; and for each user's device, modify, by a device protector, one or more information security settings of a user's device based on the identified type of the anomaly.

15. The system of claim 14, wherein the user's activity comprises at least one of: a presence at a specific location, a user's movement changing a physical location of the user, a driving of a vehicle, a user's interaction with any number of the user's devices, an interaction with at least one new device, a user's interaction with any number of user's services, an interaction of a user device or a user service with any other user device or user service, and a data exchange between any number of the user's devices.

16. The system of claim 14, wherein the one or more values of features include one or more of: an interaction of a device with a server, a connection of a new device to a network of the user's devices, a number of new devices connected to the network of the user's devices, an access to resources of one of the user's device, the resources including at least a memory or a processor, a list of resources of one of the user's device that are accessed, a feature of a particular user device, a transmission of data to or from a user device, a type of data to be transmitted, the type of data including at least one of a command, raw data or encrypted data, any number of antivirus events, and a type of activity of the user.

17. A non-transitory computer readable medium storing thereon computer executable instructions for protecting user's devices based on types of anomalies, including instructions for: determining, by a feature determiner, one or more values of features of a user's activity performed using at least one of the user's devices; detecting, by an anomaly detector, anomalies indicative of at least one threat to information security of the user's devices based on the one or more values of the features, wherein the detection is performed using a trained anomaly detection model; for each detected anomaly, identifying, by the anomaly detector, a type of anomaly and at least one device that is a source of the anomaly, wherein the type of anomaly is identified using an anomaly classifier and the one or more values of features, wherein the identification of the type of anomaly is performed using a trained anomaly classifier, wherein the trained anomaly detection model and the anomaly classifier are tested on data of a test sample and are validated using a validation sample, the testing and the validation being performed using a model trainer, the test and the validation samples further including values of features over a historical period of observation, and wherein the threat to information security due to the anomaly and the devices in which the anomaly appeared are known for at least a specified portion of the values of the features; and for each user's device, modifying, by a device protector, one or more information security settings of a user's device based on the identified type of the anomaly.

18. The non-transitory computer readable medium of claim 17, wherein the user's activity comprises at least one of: a presence at a specific location, a user's movement changing a physical location of the user, a driving of a vehicle, a user's interaction with any number of the user's devices, an interaction with at least one new device, a user's interaction with any number of user's services, an interaction of a user device or a user service with any other user device or user service, and a data exchange between any number of the user devices.

19. The non-transitory computer readable medium of claim 17, wherein the one or more values of features include one or more of: an interaction of a device with a server, a connection of a new device to a network of the user's devices, a number of new devices connected to the network of the user's devices, an access to resources of one of the user's device, the resources including at least a memory or a processor, a list of resources of one of the user's device that are accessed, a feature of a particular user device, a transmission of data to or from a user device, a type of data to be transmitted, the type of data including at least one of a command, raw data or encrypted data, any number of antivirus events, and a type of activity of the user.

\* \* \* \* \*